(12) United States Patent
Hartramph et al.

(10) Patent No.: US 6,400,047 B1
(45) Date of Patent: Jun. 4, 2002

(54) LINEAR DRIVE

(75) Inventors: Ralf Hartramph, Waiblingen; Eberhard Veit, Göppingen; Hans Scheurenbrand, Kernen, all of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/600,849

(22) PCT Filed: Oct. 28, 1999

(86) PCT No.: PCT/EP99/08166

§ 371 (c)(1), (2), (4) Date: Jul. 24, 2000

(87) PCT Pub. No.: WO00/31421

PCT Pub. Date: Jun. 2, 2000

(30) Foreign Application Priority Data

Nov. 24, 1998 (DE) .......................... 198 53 942

(51) Int. Cl.⁷ .......................... H02K 5/00; H02K 41/00
(52) U.S. Cl. .......................... 310/12; 310/89
(58) Field of Search .......................... 310/12, 13, 14, 310/15, 17, 42, 89, 112; 29/596

(56) References Cited

U.S. PATENT DOCUMENTS

| | | | | |
|---|---|---|---|---|
| 2,620,683 A | * | 9/1952 | Geyer .......................... 74/665 Q |
| 2,660,028 A | | 11/1953 | Geyer .......................... 60/709 |
| 3,050,943 A | | 8/1962 | Thorel et al. .......................... 310/12 X |
| 4,363,984 A | * | 12/1982 | Torii et al. .......................... 310/156 |
| 4,644,773 A | * | 2/1987 | Duri .......................... 72/135 |
| 5,238,222 A | * | 8/1993 | Sumida et al. .......................... 251/118 |
| 5,440,183 A | | 8/1995 | Denne .......................... 310/12 |
| 5,469,775 A | | 11/1995 | Stoll et al. .......................... 92/88 |
| 5,568,982 A | | 10/1996 | Stoll et al. .......................... 384/55 |
| 5,609,091 A | | 3/1997 | Stoll .......................... 92/110 |
| 5,637,940 A | | 6/1997 | Nagai et al. .......................... 310/80 |
| 5,638,676 A | | 6/1997 | Muller .......................... 60/407 |
| 5,685,214 A | | 11/1997 | Neff et al. .......................... 92/31 |
| 5,715,643 A | * | 2/1998 | Parkinson .......................... 52/656.9 |
| 5,746,110 A | | 5/1998 | Stoll .......................... 92/13.6 |
| 5,769,391 A | * | 6/1998 | Noller et al. .......................... 251/129.21 |
| 5,844,340 A | | 12/1998 | Noda .......................... 310/103 |
| 6,014,924 A | | 1/2000 | Stoll et al. .......................... 92/13.5 |
| 6,177,743 B1 | * | 1/2001 | Hartramph et al. .......................... 310/89 |

FOREIGN PATENT DOCUMENTS

| | | |
|---|---|---|
| DE | G 84 32 850.9 U1 | 4/1986 |
| DE | 195 12 080 A1 | 10/1995 |
| DE | 44 36 865 A1 | 8/1996 |
| DE | 297 06 098 U1 | 7/1997 |
| DE | 297 19 212 U1 | 1/1998 |
| EP | 0 656 242 A1 | 6/1995 |
| EP | 0 683 010 A1 | 11/1995 |
| JP | 10-14184 * | 1/1998 |
| WO | WO 93/01577 | 1/1993 |
| WO | WO 96/41411 | 12/1996 |
| WO | WO 98/37615 | 8/1998 |

OTHER PUBLICATIONS

Sulzer Electronic Company AG brochure entitled "Linearantriebe LinMot–P"Author and Date Unknown.

* cited by examiner

Primary Examiner—Nicholas Ponomarenko
Assistant Examiner—Judson H. Jones
(74) Attorney, Agent, or Firm—Hoffman & Baron, LLP

(57) ABSTRACT

A linear drive, which has a housing (2) delimiting a receptacle (4), in which the drive means (6) are arranged and from which the force or power transmitting member (12) extends, which cooperates with the drive means (6). The drive means (6) are a component of an electrical linear motor (18) which as a cartridge-like unit (22) is inserted is into the receptacle and secured in place in relation to the housing.

18 Claims, 3 Drawing Sheets

LINEAR DRIVE

FIELD OF THE INVENTION

The invention relates to a linear drive comprising a housing, which defines a receptacle, in which drive means are arranged and out of which at least one axial end region of a power transmission member, which is adapted to cooperate with the drive means, extends.

BACKGROUND OF THE INVENTION

Linear drives of this type are in wide use in the form of fluid power components, that is to say components operated by fluid. One possible design is to be found in the German patent publication (utility model) 29,706,098.8, which involves a linear drive designed in the form of a slide drive device and whose principal housing body comprises a cylindrical receptacle, wherein a piston constituting the drive means slides. A rod-like power or force transmitting member, connected with the piston, extends at its end out of the principal housing body and is able to be coupled with an object to be moved.

The actuation of the linear drive is performed by the action of a fluid on the piston and for positioning external abutments are provided.

In the case of linear drives of this type there is usually the problem that more especially in the case of pneumatic operation precise positioning of the power transmitting member is difficult and that slow movement of the piston tends to be jerky, this impairing exact motion and positioning.

SUMMARY OF THE INVENTION

One object of the present invention is to provide a linear drive of the type initially mentioned, which facilitates any necessary positioning measures and more especially renders possible jerk-free motion even at low speeds. This is to be combined with a simple structure of the arrangement, which is simple to assemble and fit.

In order to attain this object there is the provision in accordance with the characterizing part of claim 1 that the drive means are components of a linear electric motor, which is mounted in the receptacle as a cartridge-like unit and is fixed in relation to the housing.

Departing from the said prior art there is therefore an electrical linear drive, whose drive means belong to a so-called linear motor—a particular design of an electric motor—in the case of which the armature does not perform a rotary but rather a linear movement. The drive force is provided by a travelling magnetic field, this meaning that even in the case of slow motion there is a freedom from jerks and there is possibility of extremely smooth movement. Furthermore, such a linear motor is also characterized by low wear and reduced need for servicing.

It is furthermore an advantage in the invention that the linear motor does not have its individual parts fixed to the housing and is in fact inserted into it like a cartridge, the housing not having to perform any important operational function for the electrical drive principle of the linear motor. Accordingly it is possible for the housing to possess a configuration in accordance with the intended purpose of use, the external form not having to be different to that of a comparable fluid power linear drive and it is only instead of the drive means in the case of fluid power linear drive means the electrical linear motor may be employed. In this respect it is an advantage that in case of need, on the basis of a uniform housing, a fluid power or an electrical linear drive may be produced, that is to say with the possibility of employing a large number of identical parts. Finally, it is to be noted as an advantage that lost time due to a defect in the drive means and involving failure to operate of the linear drive may be very considerably reduced, because the cartridge-like linear motor unit may be simply and rapidly replaced.

Although the German patent publication 19,512,080 A1 discloses an electrical linear drive, in whose housing an electrical drive is inserted, recourse is had here to a conventional electric motor with a rotating drive shaft and furthermore there is no design in the form of a cartridge-like unit.

Further advantageous developments of the invention are defined in the dependent claims.

The linear motor preferably possesses a tubular or sleeve-like motor housing extending along at least part of its length, which extends into the receptacle in the housing, optimum fitting in place being ensured because the shape thereof is complementary to the internal shape of the receptacle space. In this respect it is preferred to employ a circular cross sectional shape owing to the possibility then offered of particularly simple manufacture. It would be feasible also however to have cross sectional forms departing from a circular one, more particularly if using simple means it is desired for the linear motor unit to be locked in rotation in relation to the housing.

Insertion of the linear motor into the receptacle may take place as part of a strictly linear plugging operation and/or for example by screwing in so that the assembly movement is combined with a rotary one. In this case it is possible for a suitable screw thread to be provided on the outer periphery of the motor housing to cooperate with a mating thread on the housing.

It is convenient for the receptacle, which preferably extends along at least the major part of the length of the linear motor, to be closed peripherally along its entire length, i.e. not interrupted by slot. It is possible to avoid having a special purpose design and there is the possibility of having recourse to the comparable body of a conventional fluid power linear drive for the housing.

The receptacle is preferably constituted by an elongated receptacle space extending in a principal housing body of the housing, into which space the linear motor unit is inserted like a cartridge coaxially from one end. In the case of the principal housing body it is preferably a question of extruded section, into which the receptacle space is produced in an axially continuous form.

It is preferred for the linear member to possess a motor housing arranged at least for the greater part of the length thereof in the interior of receptacle space, the power transmitting member extending from one end of it while adjacent to other end there are electrical terminal means for the supply and/or output of electrical signals, the electrical terminal means preferably being part of a compact coupling means.

Operation with a high degree of accuracy is possible, if the power transmitting member engages a guide slide, which slides externally on the housing linearly. Such a guide slide or carriage can also take up transverse forces so that the drive means, cooperating with the power transmitting member, of the linear motor can be kept substantially free of transverse loads causing wear.

Frequently electrical linear drives are in competition with fluid power linear motors, the use of one or the other type being specified by marginal conditions of the respective application. One serious disadvantage in connection with this is that the different types, as confirmed by the German patent publication (utility model) 29,706,098.8 and the German patent publication 19,512,080 A1, are extremely different so that the manufacturer do not supply both types in all overall sizes and the user is obliged to make extensive design changes in drive systems for adopting a different sort of drive. The electrical linear drive in accordance with the invention does offer the advantage here that for the production thereof recourse may be had to a single principal housing body, which may be employed alternatively as well as the principal housing body of a fluid power linear drive. For this purpose there is a provision such that the principal housing bodies in both types of linear drive are the same in their outer shape at least and the receptacle spaces provided in the principal housing bodies of the linear drive possess the same cross sectional form. Accordingly for the manufacture of the principal housing bodies one may resort to substantially identical steps and tools, this meaning that there is also compatibility for the user. The identical cross sectional form of the receptacle spaces leads to a flexible manufacture, since, dependent on the type of design, it is merely necessary for fluid power or electrically operated drive means to be inserted.

BRIEF DESCRIPTION OF THE DRAWINGS

In the following the invention will be described with reference to the accompanying drawings in detail.

DETAILED DESCRIPTION OF THE PREFERRED EMBODIMENTS

Figure 3:
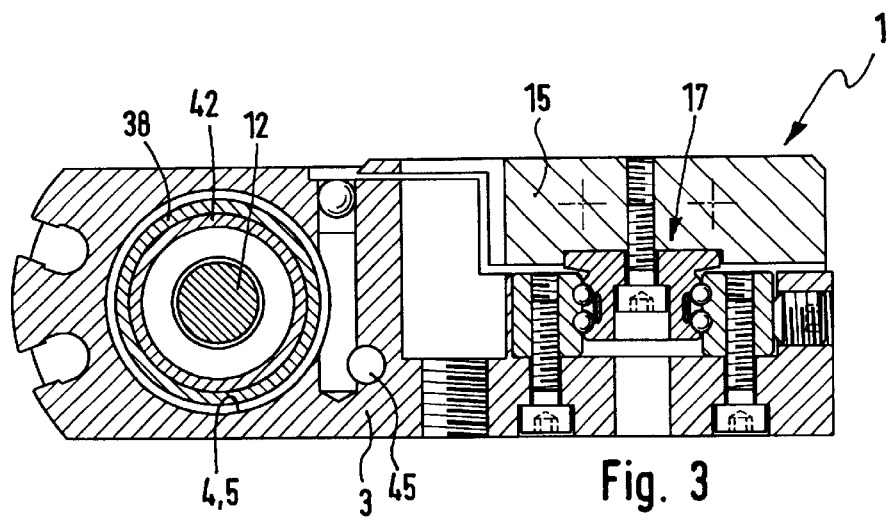
FIG. 3 shows the linear drive of FIGS. 1 and 2 in cross section on the section line III—III of FIG. 2.
Figure 4:
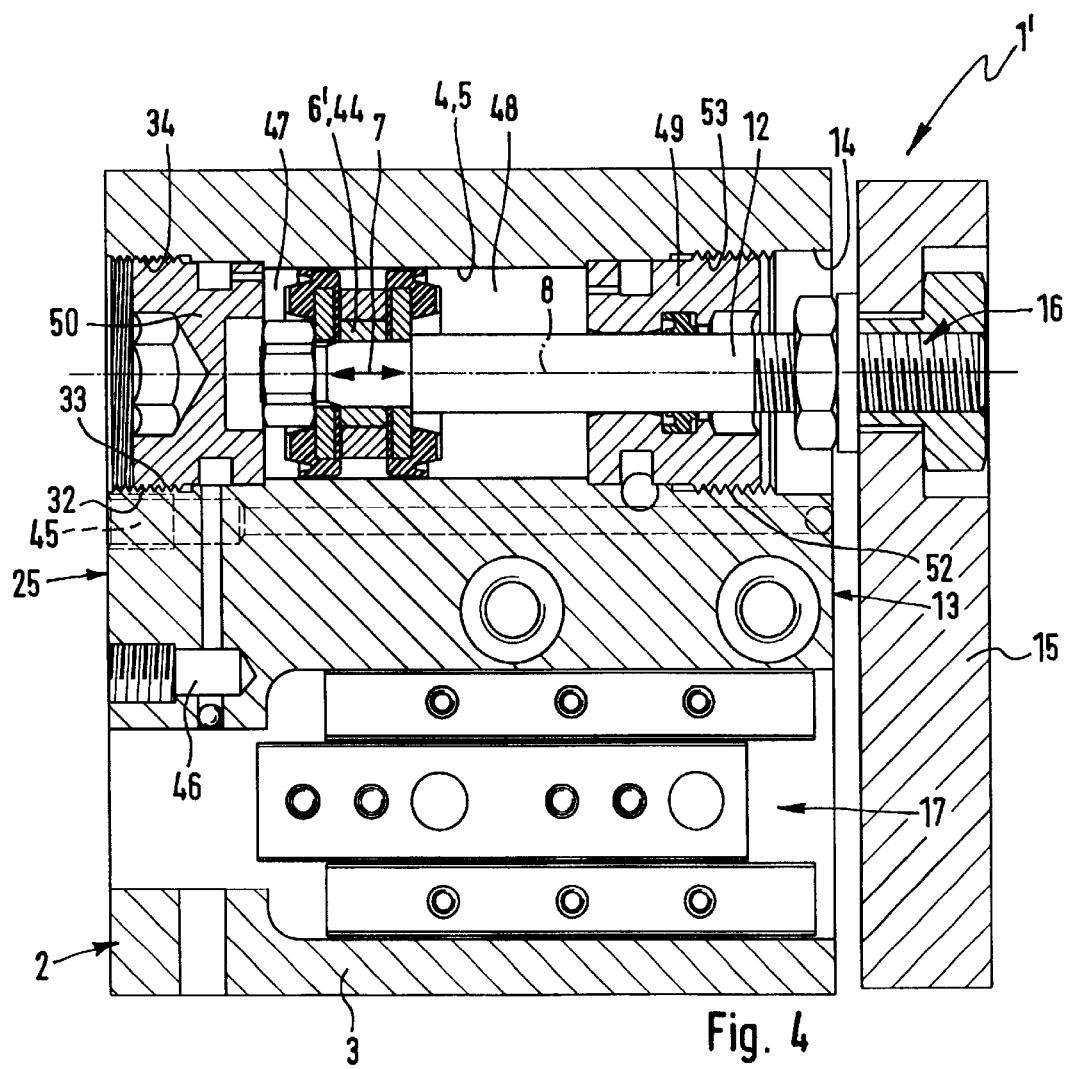
FIG. 4 shows a fluid power linear drive in a longitudinal sectional view similar to that of FIGS. 1 through 3, which while having a different drive means, is otherwise identical.

The electrical linear drive depicted in FIGS. 1 through 43 and the fluid power linear drive 1' illustrated in FIG. 4 respectively possess a housing generally referenced 2, having a principle housing body 3 preferably in the form of an extruded section. The same preferably consists of an aluminum alloy.

The housing 2 delimits an elongated receptacle 4, which is conveniently constituted by an elongated receptacle space 5 axially extending through the principal housing body 3 and which may be formed in the course of production of the principal housing body by extrusion. The receptacle space 5 is preferably peripherally complete or closed for the whole of its length.

In the interior of the receptacle 4 drive means 6 and 6' are arranged, which are able to be driven by the supply of external energy to perform a reciprocating linear movement 7 as indicated by the double arrow along the longitudinal axis 8 of the receptacle 4 or, respectively, of the receptacle space 5. The linear movement 7 may be transmitted to a preferably rod-like transmission member 12 by connection outside the housing 2, such member 12 being permanently connected with the drive member 6 and 6' axially and extending out at that axial end part 14 of the receptacle 4, which is associated with the end of the principal housing body 3, which in the following is referred to as the front side 13.

On the outer end of the power or force transmitting member 12 it would be possible to attach a component to be moved. In order to enhance the accuracy of motion and to reduce wear of the drive means 6 and 6' and of the power transmitting member 12 it is however an advantage if the section, which is to the outside of the receptacle 4, of the power transmitting member 12 is, in manner comparable with the working embodiments, secured to a guide slide 15 (at the attachment point 16), which for its part slides on the principal housing body 3 in a direction parallel to the longitudinal axis 8 with the aid of an intermediate linear guide 17.

It is convenient for the guide slide 15 to overlap the principle housing body 3 in the axial direction, the degree of overlap being dependent on the instantaneous position in the stroke of the associated drive means 6 and 6'. The guide slide 15 is suitable for the attachment of any components to be moved, the linear guide means 17 taking up any transverse forces so that the drive side is kept free of loads in this respect.

In the In the working examples the arrangement is such that the drive part comprising the drive means 6 and 6' and the guide part, comprising the longitudinal guide means 17 means of the respective linear drive 1 and 1', are arranged alongside each other so that there is a particularly low or flat design. Other arrangements would however be possible as well, as for instance a guide slide extending above the drive part.

Figure 1:
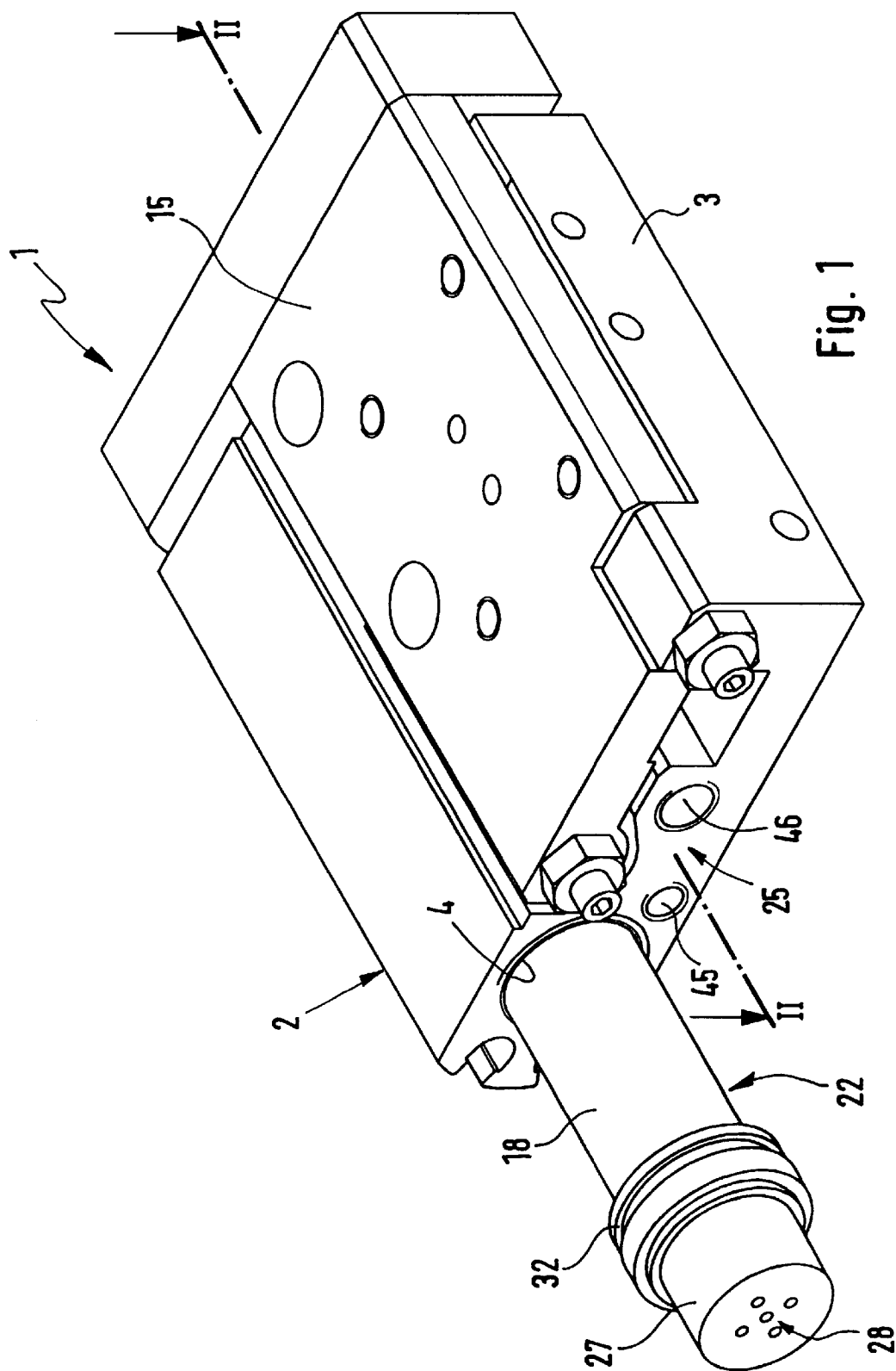
FIG. 1 shows a preferred design of an electrical limit drive in an oblique perspective rear view, the electrical linear motor employed being illustrated in an intermediate position assumed in the course of assembly.
Figure 2:
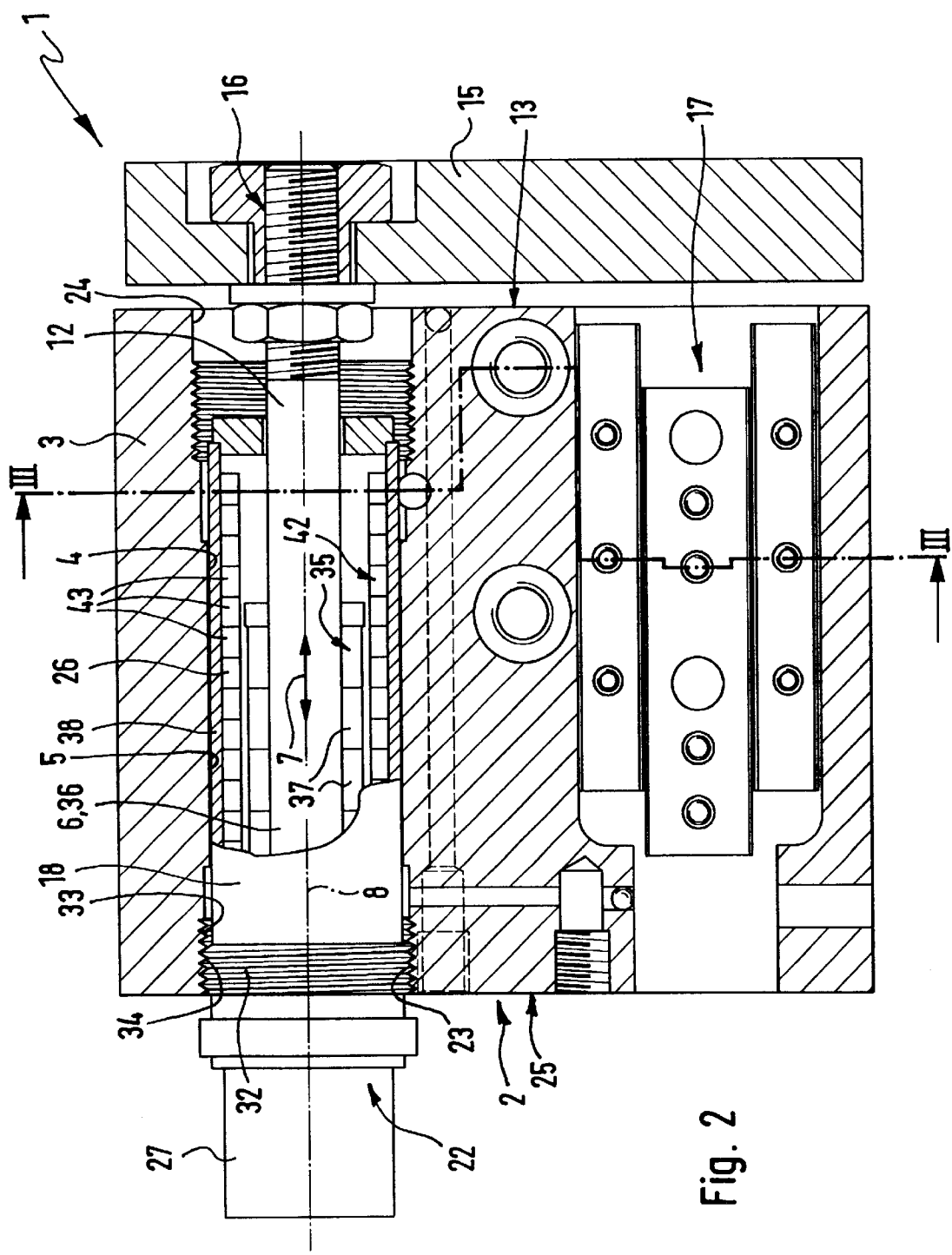
FIG. 2 shows the linear drive of FIG. 1 in a longitudinal section taken in a horizontal plane as indicated by the section line II—II.

The electrical linear drive 1 of FIGS. 1 through 3 is more particularly characterized by its drive means 6 being a component of an electrical linear motor 18, which as a cartridge-like unit—referred to in what follows as a linear motor unit 22—is inserted into the receptacle 4 and is fixed in the housing. All drive parts are accordingly collected together compactly and in the illustrated working example are inserted from one of the two terminal openings 23 and 24 coaxially into the receptacle space 5.

It is in this manner that the fitting and assembly of the electrical linear drive 1 is extremely simple and interruptions in operation due to servicing are substantially reduced, because in the case of there being a defect rapid replacement of the linear motor unit 22 may take place. In the case of the illustrated working embodiment the linear motor unit 22 is inserted via the opening 23 at the rear side 25 of the principal housing body 2 into the receptacle space 5. In this respect the overall length of the linear motor 18 is so matched to the overall length of the principal housing body 3 that it is for a major part taken up in the interior of the receptacle space 5.

In the illustrated working embodiment the arrangement is such that the motor housing 26 of the linear motor is completely taken up within the receptacle space 5 and only an interface body 27, which adjoins the rear of the motor housing 26, extends past the principal housing body 3. The interface body 27 possesses electrical terminal means 28, indicated only diagrammatically, which serve for the supply and/or output of signals employed for the operation of the linear motor 18. Electrical actuating signals are regularly supplied via the electrical terminal means, which bring about a linear stroke movement of the drive means 6. Furthermore it is possible for detection signals to be supplied, which stem from a position detecting means integrated in the linear motor 18, and with the aid of which an exact positioning of the drive means 6, and of the force transmitting member 12 connected with it, is possible.

The electrical terminal means 28 may, as illustrated, be a component of a multi-pole or multi-pin coupling means, which is more especially designed in the form of a plug element.

The mounting of the linear motor 18 fixed to the housing may be performed using any desired attachment means. In the illustrated working embodiment it is ensured by screwing the linear motor 18 together with its motor housing 26 in the receptacle space 26. For this purpose on its outer periphery the motor housing 26 possesses an external screw thread 32, which is preferably limited to the rear end part of the motor housing 26 and which fits into a complementary internal screw thread 33 provided in the rear axial end part 34 of the receptacle space 5. Accordingly assembly is performed by a combined plugging and screwing operation, the linear motor 18 being moved with its thread-free front part to the fore and plugged through rear opening 23 in the receptacle 4 until the external thread 32 makes contact with the internal thread 33 following which the motor housing 26 is also turned about the longitudinal axis until the two threads are screwed together and both the axial and also the angular position of the motor housing 26 are set in relation to the principal housing body 3. The axial position may here be predetermined by the set length of the thread or by separate abutment means not illustrated in detail.

More especially in the case of an embodiment, in which linear motor 18 is placed in the receptacle 4 using at least a rotary movement, it is an advantage if at least the length section within receptacle the 4, of the motor housing 26 possesses a circular outer form. This circularly cylindrical length section then means that the motor housing 26 may make very adequate contact with the inner face of the receptacle space 5, if, as illustrated, the internal shape of the space 5 is made complementary to the outer shape of the respective length section of the motor housing 26.

However, designs are also possible, in the case of which the inner cross sectional shape of the receptacle space 5 and the outer cross sectional shape of the length section, associated with it, of the motor housing 26 are non-circular, oval or polygonal forms and more especially rectangular or square configurations being possible. Such designs furthermore possess the advantage that the angular position of the motor housing 26 is automatically predetermined on assembly and simultaneously the angular position is locked.

Owing to the exact adaptation of the cross sectional shapes it is possible to ensure that the linear motor 18 is well held in the transverse direction and is secured in position even when the attachment means (threads 32 and 33), serving for axial fixation, are restricted to the end part of the motor housing 26.

The linear motor may be of any known) type, as for example a design indicated in the schedule of types designated as "Linearantriebe LinMot-P" of the Sulzer "Electronics AG Company". Preferably the linear motor operates in accordance with the electrodynamic principle, the reaction forces being directed to a permanent magnet arrangement 35. The drive means 6 are constituted for instance by a piston-like armature 36, which bears the said permanent magnet arrangement 35, which is best composed of a plurality of coaxially following and preferably segmented annular permanent magnets 37, which are radially magnetized, the direction of magnetization of sequentially following permanent magnet 37 being opposite.

The permanent magnet arrangement 35 is mounted on a carrier, which in the working example is constituted by a section of the length of the force transmitting 12.

The armature 36 is located in the interior of a tubular section 38 of the length of the motor housing 26, which is preferably made of steel material and forms an magnetic return circuit. On the inner face of the tubular section 38 there is a tubular coil arrangement 42 surrounding the armature 36 coaxially with a radial play and consisting of a plurality of sequential coil parts 43, whose axial width is best made equal to half the width of the individual permanent magnets 37. The coil parts are in the working example placed in series in halves, one half of the coils again having a reversed direction of the magnetization to produce a uniform direction of action of the force. Operation is by means of electrical voltage signals, which are supplied via the electrical terminal means 28 and produce the effect that a traveling field causes the linear drive of the armature 36 in the one or in the other axial direction in relation to the coil arrangement 42 and to the motor housing 26.

In a complementary manner the coil arrangement 42 can be so designed that it works via detection of the position of the armature 36 so that it is possible to speak of a position detection means integrated in the drive motor.

It will be clear that the electrical linear drive renders possible a design which is identical to that of fluid power drives and for instance pneumatic linear drives so that on the basis of identical basic parts it is possible for linear drives with an electrical or a fluid power manner of operation to be manufactured in a rational and flexible manner. This is made particularly clear in FIG. 4, which illustrates a fluid power linear drive 1', whose design is the same as that of the electrical drive illustrated in FIGS. 1 through 3 with the exception of the different drive means.

In the case of the linear drive 1' of FIG. 4 the components corresponding to those of the electrical linear drive 1 are referenced identically. As will be readily apparent, the combination of the guide slide 15 and the principal housing body 3 is identical in both types of linear drive 1 and 1'. Instead of the electrically operated drive means 6 however fluid operated drive means 6' are employed, which in the working example are constituted by a piston 44, which runs in the receptacle 4 and makes sliding contact with the inner peripheral face of the receptacle space 5. The linear motor unit 22 is in this case completely removed and the force transmitting member 12 comprises a piston rod, which at one end is attached to the piston 44 and at the other end engages the guide slide 15.

Compared with the electrical linear drive 1 the outer configuration of the fluid power linear drive 1' is at least essentially and preferably completely identical and as a further point of agreement both the receptacle spaces 5 possess the same cross sectional form. There is accordingly the possibility—on the basis of one and the same overall size of housing 2—of selectively using an electric linear motor 18 or a piston 44 in the receptacle space 5 and accordingly of selecting the manner of operation of the linear drive as may be required.

In the interior of the principal housing body 3 fluid ducts 45 and 46 are formed, which are only employed in the case of application as a fluid power linear drive 1' and in the case of use as an electrical linear drive 1 remain unused. In the case of use as a fluid power linear drive 1 in accordance with FIG. 4 they serve for the supply and/or output of the fluid and more particularly pneumatic pressure medium supplying the drive force for the piston 44.

Each of the two fluid ducts 45 and 46 extends in the interior of the principal housing body 3 between an external face—here the rear side 25—of the housing and one of two working spaces 47 and 48, which the piston 44 separates from each other in the receptacle space 5. At its two axial end parts 14 and 34 the receptacle space 5 is respectively closed by a terminal wall 49 and 59, fixed in relation to the housing, each of such terminal walls 49 and 50 constituting a limiting wall, opposite to the piston 4, for one of the working spaces 47 and 48. Accordingly it is possible—via the external duct openings, with which fluid ducts leading to other equipment may be connected—for the supply of fluid to the working spaces 47 and 48 and accordingly of the axial stroke motion of the piston 44 and of the force transmitting member 12, to be controlled.

The rear terminal wall 50 is designed like a cover and is more especially inserted axially into the receptacle space 5 so that it preferably does not extend past the rear side 25. Attachment is performed using a screw connection, the above mentioned internal screw 33 thread being employed, into which the rear terminal wall 50 is screwed using a complementary external screw thread 54.

Using a similar screw attachment the front terminal wall 49 is also fixed to the principal housing body 3, since its external screw 52 is screwed into the front end part 14, provided with a internal screw thread 53, of the receptacle space 5. This internal screw thread 53 may be left unused in the case of a linear drive of the electrical type in accordance with FIGS. 1 through 3.

The front terminal wall 49 of the housing 2 is designed in the form of an annular member or a sleeve, it surrounding the rod-like force transmitting member 12 with a sealing effect. Furthermore the front terminal wall 49 preferably has its full length within the receptacle space 5 axially.

It is clear that there is therefore a possibility of producing a plurality of linear drives able to be employed independently from each other, and including at least one electrical linear drive 1 and at least one fluid power linear drive 1', such two linear drives being essentially identical as regards their outer configuration so that in manufacture it is possible to use, at least to a predominant extent, identical parts and accordingly identical tooling and moreover at the site of application there will be compatibility of installation measures. The identical cross section of the receptacles in the two cases here offers the possibility of installing, selectively, electrically actuated drive means 6 or fluid power drive means 6', something which lead to a high degree of flexibility in the case of the production of linear drives. If the electrical drive means include electrical linear motors compactly assembled as a cartridge, assembly and fitting is particularly simplified, because assembly by insertion is possible and this saves time.

What is claimed is:

1. A linear drive comprising a housing (2), which defines a receptacle (4), in which drive means (6) are arranged and out of which at least one axial end part (14) of a power transmitting member (12), which is adapted to cooperate with the drive means (6), extends, wherein the drive means (6) are components of a linear electric motor (18), which is mounted in the receptacle (4) as a cartridge-like unit (22) and is fixed in relation to the housing and wherein the motor including a motor housing (26), being received in the receptacle (4) and having an outer shape complementary to the inner shape of the receptacle (4).

2. The linear drive as claimed in claim 1, characterized in that the cross sectional form of the receptacle (4) and of the length section therein of the motor housing (26) is circular.

3. The linear drive as claimed in claim 1, characterized in that the cross sectional form of the receptacle (4) and of the length section arranged therein of the motor housing (26) is not circular and in this respect preferably oval or rectangular in design.

4. The linear drive as claimed in claim 1, characterized in that the linear motor (18) is plugged and/or screwed into the receptacle (4).

5. The linear drive as claimed in claim 1, characterized in that the receptacle (4) has an unbroken periphery for its entire length.

6. The linear drive as claimed in claim 1, characterized in that the receptacle (4) is constituted by an elongated receptacle space (5) extending in a principal housing body (3) of the housing (2), into which space the cartridge-like linear motor unit (22) is inserted coaxially.

7. The linear drive as claimed in claim 6, characterized in that the linear motor (18) has a motor housing (26) arranged at least for a major part of its length in the interior of the receptacle space (5) and from one end of the housing the force transmitting member (12) extends out and at the other end has electrical terminal means (28) for the supply and/or output of electrical signals.

8. The linear drive as claimed in claim 7, characterized in that the electrical terminal means (28) are components of a coupling means, which is more particularly in the form of a plug means.

9. The linear drive as claimed in claim 6, characterized in that the receptacle space (5) extends through the principal housing body (3) in the longitudinal direction completely.

10. The linear drive as claimed in claim 6, characterized in that the principal housing body (3) is an extruded body consisting more especially of aluminum.

11. The linear drive as claimed in claim 6, characterized in that the electrical linear motor (18) does not extend out of the receptacle space (5) or only does so to a slight extent.

12. The linear drive as claimed in claim 1, characterized in that the drive means (6) of the electrical linear motor comprise a coil arrangement (42) mounted in a stationary manner on the motor housing (26) and a linearly moving armature (36) cooperating with the force transmitting member (12) and having a permanent magnet arrangement (35).

13. The linear drive as claimed in claim 1, characterized in that the force transmitting member (12) engages a guide slide (15) which is arranged externally on the housing (2) for linear sliding motion.

14. The linear drive as claims in claim 1, characterized in that it is a component of a plurality of mutually separately usable linear drive (1 and 1') including, in addition to the electrical linear drive (1) furthermore at least one fluid power linear drive (1'), whose principal housing body (3) has receptacle space (5) for fluid operated drive means (6'), the principal housing body (3) of the electrical linear drive and of the fluid power linear drive (1 and 1') being at least substantially identical as regards their external form and the receptacle spaces (5) of the two linear drives (1 and 1') possess the same cross sectional form.

15. The linear drive as claims in claim 14, characterized in that the combination of guide slide (15) and principal housing body (3) is identical in the case of the electrical and of the fluid power linear drive (1 and 1').

16. The linear drive as claimed in claim 14, characterized in that the drive means (6') of the fluid power linear drive (1') comprise an axially sliding piston (44) running on the inner periphery of the receptacle space (5).

17. The linear drive as claimed in claim 14, characterized in that the receptacle space (5) of the fluid power linear drive (1') is sealed off at both axial end parts (14 and 34) by means of terminal walls (49 and 50) fixed to the principal housing body, such walls preferably extending axially into the receptacle space (5).

18. A linear drive comprising:

a housing defining a receptacle drive means securably mountable in the housing having a power transmitting member extending out of at least one drive means axial end part, and the drive means including a linear electric motor, which is mounted in the receptacle as a cartridge-like unit, and wherein the drive means has an accessible portion extending from the housing when secured thereto to facilitate securing and removal of the drive means with respect to the housing.

\* \* \* \* \*

UNITED STATES PATENT AND TRADEMARK OFFICE
CERTIFICATE OF CORRECTION

PATENT NO. : 6,400,047 B1
DATED : August 15, 2002
INVENTOR(S) : Hartramph et al.

It is certified that error appears in the above-identified patent and that said Letters Patent is hereby corrected as shown below:

Title page,
Item [74], *Attorney, Agent or Firm*, now reads "Hoffman & Baron, LLP", should read -- Hoffmann & Baron, LLP --

Item [57], ABSTRACT,
Line 6, now reads "is inserted is into", should read -- is inserted into --

Column 3,
Line 46, now reads "depicted in FIGS. 1 through 43", should read -- depicted in FIGS. 1 through 3 --

Column 4,
Line 26, now reads "In the In the working", should read -- In the working --

Signed and Sealed this

Third Day of December, 2002

JAMES E. ROGAN
*Director of the United States Patent and Trademark Office*